(12) United States Patent
Lin et al.

(10) Patent No.: US 8,209,271 B1
(45) Date of Patent: Jun. 26, 2012

(54) PREDICTIVE MODEL TRAINING ON LARGE DATASETS

(75) Inventors: Wei-Hao Lin, New York, NY (US);
Travis H. K. Green, New York, NY (US); Robert Kaplow, New York, NY (US); Gang Fu, Kearny, NJ (US);
Gideon S. Mann, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/249,725

(22) Filed: Sep. 30, 2011

Related U.S. Application Data

(60) Provisional application No. 61/523,665, filed on Aug. 15, 2011.

(51) Int. Cl.
*G06F 15/18* (2006.01)
(52) U.S. Cl. ........................................................ 706/12
(58) Field of Classification Search ...................... 706/12
See application file for complete search history.

(56) References Cited

U.S. PATENT DOCUMENTS

| | | | |
|---|---|---|---|
| 7,349,919 B2 | 3/2008 | Russell et al. | |
| 7,788,195 B1 * | 8/2010 | Subramanian et al. | ......... 706/20 |
| 2003/0212851 A1 | 11/2003 | Drescher et al. | |
| 2005/0234753 A1 | 10/2005 | Pinto et al. | |
| 2009/0106178 A1 | 4/2009 | Chu | |

OTHER PUBLICATIONS

DCFMS: A chunk-based distributed file system for supporting multimedia communication, Poteras, Cosmin Marian; Mocanu, Mihai; Petrisor, Constantin; Mihaescu, Cristian Marian; Computer Science and Information Systems (FedCSIS), 2011 Federated Conference on Publication Year: 2011 , pp. 737-741.*
Generating models of mental retardation from data with machine learning, Mani, S.; McDermott, S.W.; Pazzani, M.J.; Knowledge and Data Engineering Exchange Workshop, 1997. Proceedings Digital Object Identifier: 10.1109/KDEX.1997.629850 Publication Year: 1997 , pp. 114-119.*
A grammatical approach to reducing the statistical sparsity of language models in natural domains, English, T.; Boggess, L.; Acoustics, Speech, and Signal Processing, IEEE International Conference on ICASSP '86. vol. 11 Digital Object Identifier: 10.1109/ICASSP.1986.1168955 Publication Year: 1986 , pp. 1141-1144.*
U.S. Appl. No. 12/780,751, Mann et al., Predictive Analytic Modeling Platform, filed May 14, 2010.
U.S. Appl. No. 12/782,689, Mann et al., Predictive Analytic Modeling Platform, filed May 18, 2010.
U.S. Appl. No. 13/014,252, Breckenridge et al., Dynamic Predictive Modeling Platform, filed Jan. 26, 2011.
U.S. Appl. No. 13/014,223, Breckenridge et al., Updateable Predictive Analytical Modeling, filed Jan. 26, 2011.
U.S. Appl. No. 13/245,564, Breckenridge et al., Updateable Predictive Analytical Modeling, filed Sep. 26, 2011.
U.S. Appl. No. 13/170,067, Breckenridge et al., Customized Predictive Analytical Model Training, filed Jun. 27, 2011.
U.S. Appl. No. 13/171,423, Breckenridge et al., Predictive Analytical Model Training, filed Jun. 28, 2011.
U.S. Appl. No. 13/172,714, Wei-Hao Lin et al., Predictive Analytical Model Matching, filed Jun. 29, 2011.
U.S. Appl. No. 13/246,229, Wei-Hao Lin et al., Predictive Analytical Model Matching, filed Sep. 27, 2011.

(Continued)

*Primary Examiner* — Michael B Holmes
(74) *Attorney, Agent, or Firm* — Fish & Richardson P.C.

(57) ABSTRACT

Methods, systems, and apparatus, including computer programs stored on a computer storage medium, for training predictive models using large datasets.

27 Claims, 3 Drawing Sheets

OTHER PUBLICATIONS

U.S. Appl. No. 13/101,040, Wei-Hao Lin et al., Predictive Analytical Modeling Accuracy Assessment, filed May 4, 2011.
U.S. Appl. No. 13/277,052, Lin et al., Predictive Model Importation, filed Oct. 19, 2011.
U.S. Appl. No. 13/246,541, Wei-Hao Lin et al., Predictive Analytical Modeling for Databases, filed Sep. 27, 2011.
U.S. Appl. No. 13/246,410, Wei-Hao Lin et al., Predictive Analytical Model Selection, filed Sep. 27, 2011.
U.S. Appl. No. 13/223,067, Lin et al., Training Data Expansion, filed Aug. 31, 2011.
U.S. Appl. No. 13/101,048, Wei-Hao Lin et al., Predictive Analytical Modeling Data Selection, filed May 4, 2011.
U.S. Appl. No. 13/248,474, Wei-Hao Lin et al., Score Normalization, filed Sep. 29, 2011.
U.S. Appl. No. 13/250,394, Lin et al., Predictive Model Application Programming Interface, filed Sep. 30, 2011.
U.S. Appl. No. 13/209,358, Wei-Hao Lin et al., Combining Predictive Models in Predictive Analytical Modeling, filed Oct. 3, 2011.
U.S. Appl. No. 13/209,358, Wei-Hao Lin et al., Determining a Type of Predictive Model for Training Data, filed Aug. 12, 2011.
U.S. Appl. No. 13/159,882, Wei-Hao Lin et al., Predictive Model Caching, filed Jun. 14, 2011.
U.S. Appl. No. 13/246,596, Wei-Hao Lin et al., Hosting Predictive Models, filed Sep. 27, 2011.
U.S. Appl. No. 13/195,349, Wei-Hao Lin et al., Improving Predictive Modeling Accuracy, filed Aug. 1, 2011.
U.S. Appl. No. 13/179,204, Wei-Hao Lin et al., Generating Training Data for Predictive Models, filed Jul. 8, 2011.
U.S. Appl. No. 13/198,900, Wei-Hao Lin et al., Anomaly Detection, filed Aug. 5, 2011.
U.S. Appl. No. 13/272,178, Wei-Hao Lin et al., Confidence Scoring in Predictive Modeling, filed Oct. 12, 2011.
U.S. Appl. No. 13/218,623, Wei-Hao Lin et al., Multi-Label Modeling, filed Aug. 26, 2011.
U.S. Appl. No. 13/228,365, Lin et al., Suggesting Training Examples, filed Sep. 8, 2011.
U.S. Appl. No. 13/245,688, Lin et al., Suggesting Training Examples, filed Sep. 26, 2011.
U.S. Appl. No. 13/224,245, Robert Kaplow et al., Predictive Model Evaluation and Training Based on Utility, filed Sep. 1, 2011.
Duchi, John, et al., "Boosting with Structural Sparsity", 2009, cs.berkeley.edu [online]. [Retrieved on Jan. 25, 2011]. Retrieved from the Internet: <URL: http://www.cs.berkeley.edu/~jduchi/projects/DuchiSi09d.pdf>, 41 pages.
Duchi, John, et al., "Boosting with Structural Sparsity", Proceedings of the 26th International Conference on Machine Learning, Montreal, Canada, 2009, cs.berkeley.edu [online]. [Retrieved on Jan. 25, 2011]. Retrieved from the Internet: <URL: http://www.cs.berkeley.edu/~jduchi/projects/DuchiSi09a.pdf>, 8 pages.
R-Project web pages, 190 pages [online]. [Retrieved on May 18, 2010]. Retrieved from the Internet: <URL: http://www.r-project.org/>, 190 pages.
Uclassify web pages, [online]. [Retrieved on May 18, 2010]. Retrieved from the Internet: <URL: http://www.uclassify.com>, 16 pages.
Zementis web pages [online]. [Retrieved on May 18, 2010]. Retrieved from the Internet: <URL: http://www.zementis.com>, 34 pages.
Weiss, Integrating Real-Time Predictive Analytics into SAP Applications [online], Dec. 30, 2009 [retrieved on Sep. 29, 2011], Retrieved from the Internet:,URL:http://www.sdn.sap.com/irj/scn/go/portal/prtroot/docs/library/uuid/a07faefd-61d7-2c10-bba6-89ac5ffc302c?QuickLink=index&overridelayout=true>, 1 page.
Hutter, et al., "Performance Prediction and Automated Tuning of Randomized and Parametric Algorithms,", Principles and Practice of Constraint Programing, Lecture Notes in Computer Science, 2006, 15 pages.
SAS Rapid Predictive Modeler, Overview, 2010, 4 pages.
Postema, et al., "A Decision Support Tool for Tuning Parameters in a Machine Learning Algorithm", Nanyang Techonological University, 1997, 9 pages.
"Active learning (machine learning)," Wikipedia, the free encyclopedia, [online] [retrieved on Sep. 8, 2011]. Retrieved from the Internet: http://en.wikipedia.org/wiki/Active learning (machine learning), 3 pages.

* cited by examiner

PREDICTIVE MODEL TRAINING ON LARGE DATASETS

CROSS-REFERENCE TO RELATED APPLICATIONS

Under 35 U.S.C. §119, this application claims benefit of pending U.S. Provisional Application Ser. No. 61/523,665, filed Aug. 15, 2011, the entire contents of which are hereby incorporated by reference.

BACKGROUND

This specification relates to training of predictive models. Predictive modeling generally refers to techniques for extracting information from data to build a model that can predict an output from a given input. Predicting an output can include predicting future trends or behavior patterns, or performing sentiment analysis, to name a few examples. Various types of predictive models can be used to analyze data and generate predictive outputs. Examples of predictive models include Naive Bayes classifiers, k-nearest neighbor classifiers, support vector machines, and logistic regression techniques, for example. Typically, a predictive model is trained with training data that includes input data and output data that mirror the form of input data that will be entered into the predictive model and the desired predictive output, respectively. The amount of training data that may be required to train a predictive model can be large, e.g., in the order of gigabytes or terabytes. The number of different types of predictive models available is extensive, and different models behave differently depending on the type of input data.

SUMMARY

Predictive model training datasets can be very large. With the advent of cloud computing and virtually unlimited storage, training sets have grown even larger. In various implementations, a training dataset that is too large to fit into a single computer's memory is divided into N chunks. The chunks can each contain the same number of examples or, alternatively, some or all of the chunks can contain different numbers of examples. Each chunk is distributed to one of M different computing devices. Each computing device trains its own predictive model on the chunk(s) of data it receives in parallel with the other computing devices. The resulting trained predictive models are then combined into a single predictive model. The computing devices cut short the training of a predictive model on a particular chunk of the training dataset when the accuracy of the particular predictive model has plateaued. When training is cut short, training on another chunk can immediately commence. This allows for a reduction in the overall number of computing devices M that are required to process a given dataset.

Particular embodiments of the subject matter described in this specification can be implemented so as to realize one or more of the following advantages. Predictive models can be trained on datasets that are too large to fit in a computer's memory. A number of computing devices can train individual predictive models in parallel with other computing devices. Parameters describing the individual predictive models can be combined into a final predictive model. Fewer computing devices can be used to train a predictive model since each computing device does not necessarily need to use all of the examples in each dataset chunk it receives for training A given computing device monitors the learning curve of its individual predictive model in order to reduce the number of training examples needed to train the model. This allows the computing device to potentially process more training data in a shorter amount of time.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
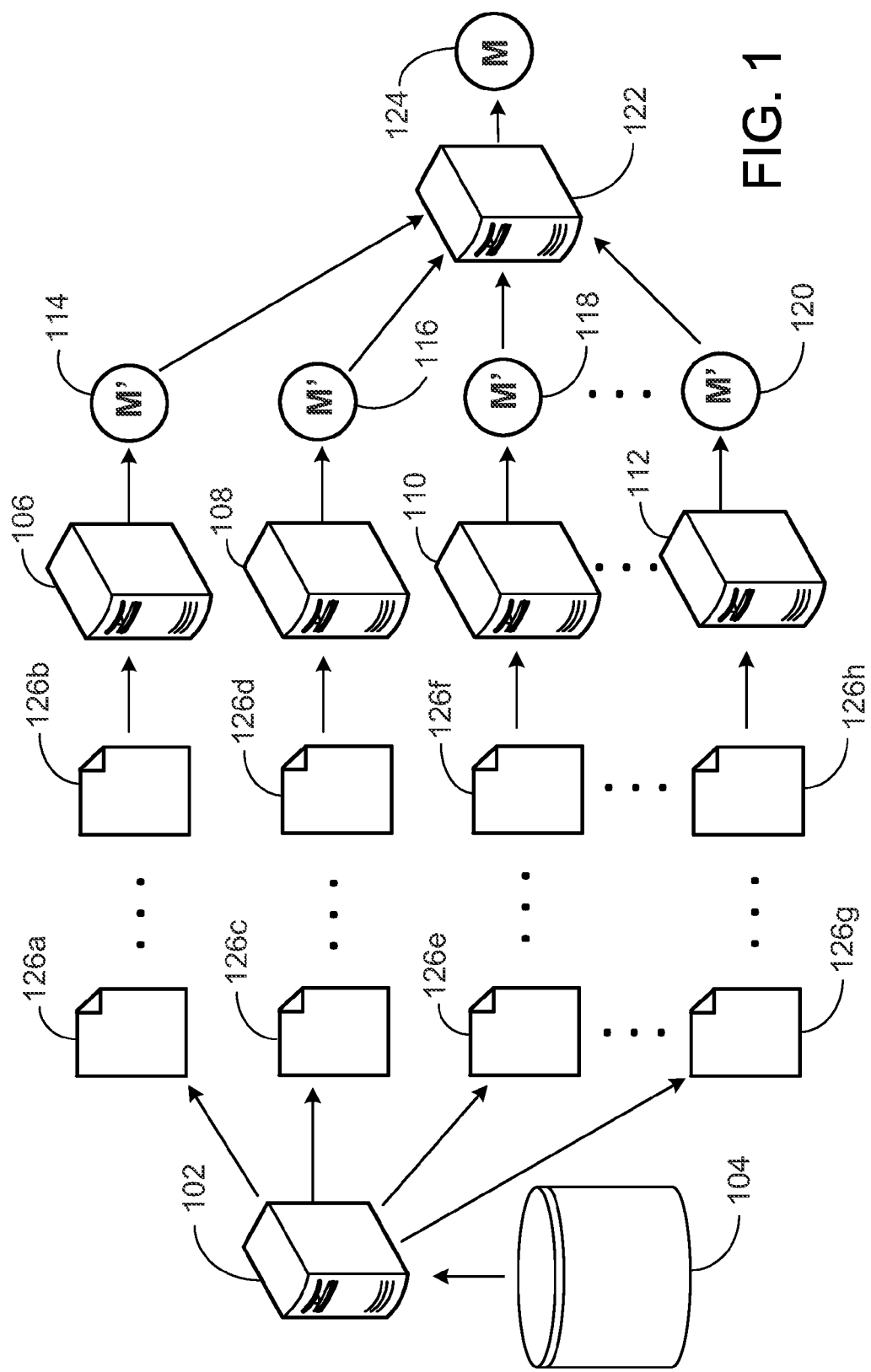
FIG. 1 is an illustration of an example predictive model training system.

In various implementations, a predictive model (or "model") is either a categorical model if its predictions are categories, or is a regression model if its predictions are numeric. A predictive model is trained using training data. Training data encompasses examples that each comprise one or more data fields plus an outcome (a category or a numeric value) for that example. By way of illustration, the training data in TABLE 1 consists of examples that are email message subject lines and a category that indicates whether each example represents SPAM or not.

TABLE 1

| EMAIL SUBJECT LINE | OUTCOME |
| --- | --- |
| "You have won $$$" | "spam" |
| "Lose weight fast!" | "spam" |
| "Lowest interest rates ever!" | "spam" |
| "How are you?" | "not spam" |
| "Trip to New York" | "not spam" |

After a model has been trained against training data, queries can be submitted to the model. In some implementations, queries are similar in form to training examples: that is, a query has the same or fewer data fields but does not include the outcome. The trained model uses patterns that it learned from the training data to either find the closest category for the submitted query (if it is a categorical model) or estimate a value for the query (if it is a regression model), and returns the category or value.

A model can be expressed as a model representation to allow models to be exchanged between systems. In some implementations, the model representation is a Predictive Model Markup Language (PMML) document. PMML is an eXtensible Markup Language (XML)-based language. Other model representations are possible such as, for example, formatted or unformatted text. The PMML specification is an XML schema. Instances of models are XML documents that conform to the schema. A PMML document can represent more than one model. Generally speaking, a PMML document can contain some or all of the information described in TABLE 2. The PMML document can also contain information not described in TABLE 2.

TABLE 2

| SECTION | DESCRIPTION |
|---|---|
| Header | The header contains general information about the PMML document, such as copyright information for the model, its description, and information about the application used to generate the model. |
| Data Dictionary | The data dictionary contains definitions for all the possible fields used by the model. |
| Data Transformations | The data transformations specify mappings of user data into different forms to be used by the model. |
| Model | Contains the definition of the particular model. |
| Mining Schema | The mining schema lists all fields used in the model. This can be a subset of the fields as defined in the data dictionary. It contains specific information about each field, such as the field's name and what should happened when there is a missing value. |
| Targets | Targets specify post-processing for the predicted value. |
| Output | The output provides a name any output fields expected from the model, including the predicted value. |

FIG. 1 illustrates a predictive model training system 100. The elements of the system 100 can comprise data processing apparatus in one or more geographic locations. The system 100 comprises a data distribution node 102 which is one or more data processing apparatus programmed with computer instructions for dividing a large predictive model training dataset 104 into smaller chunks 126a-n. In some implementations, the chunks are small enough to fit in the available random access memory or virtual memory of a learner (e.g., learners 106, 108, 110 and 112). The data distribution node 102 distributes the chunks 126a-n to learners 106, 108, 110 and 112 which are individual data processing apparatus that are programmed with computer instructions for processing the chunks. For example, learner 106 is responsible for processing chunks 126a-126b, learner 108 is responsible for processing chunks 126c-d, learner 110 is responsible for processing chunks 126e-f, and learner 112 is responsible for processing chunks 126g-h. Each learner uses its chunks to train its own predictive model. Learner processing is described further below.

The training dataset 104 can be stored in a distributed file system or a distributed database, for example. In some implementations, the data distribution node 102 randomizes the dataset 104 before the dataset is divided into chunks and distributed to the learners 106, 108, 110 and 112. By way of illustration, the order of examples in the training dataset 104 can be changed so that each training example is moved to a new, random location in the order. Various randomization techniques can be used such as, for instance, random permutation and random sampling. Randomization of the training dataset 104 endeavors to increase the variety of training examples in each chunk.

The data distribution node 102 distributes the chunks to the learners 106, 108, 110 and 112 through a communication network shared by elements in the system 100. The communication network can be an intranet, shared memory, a proprietary bus, or combinations of these, for example. Other types of communication networks are possible. The number of chunks each learner receives can be determined by dividing the number of chunks by the number of learners, for example. Distribution of the chunks to the learners 106, 108, 110 and 112 can be accomplished in various ways. Chunks can be distributed to the learners 106, 108, 110 and 112 in the order in which they occur in the randomized dataset (e.g., in a round robin fashion) or in another order such as a random order. In further implementations, if a given learner is understood to have more processing resources (e.g., CPU processing power, physical memory) than another learner, more chunks can be distributed to the former than to the later. In further implementations, the data distribution node 102 can monitor the chunk processing progress of each learner 106, 108, 110 and 112 and redistribute yet-to-be-processed chunks to learners that are processing chunks faster than other learners.

In some implementations, the number of learners made available to process the dataset 104 is based on the status of the user who is requesting the training Users that have a premium status can be allotted more learners than other kinds of users, for example. In other implementations, the number of learners made available to process the dataset 104 is a function of the status of the user who is requesting the training and available resources in the system 100. For instance, if there are a small number of available learners in the system 100, the number of learners available for a premium user will be less than desired. In further implementations, the number of learners used to process the dataset 104 is also based on the size of the dataset 104. For example, larger datasets will be allotted more learners than smaller datasets. In further implementations, additional learners can be allotted to process a dataset 104 as the learners become available. This allows the data distribution node 102 to redistribute chunks to newly available learners.

The learners 106, 108, 110 and 112 each are programmed with computer instructions for training a local predictive model on the data chunks the learner is responsible for processing. The learner 106 trains local predictive model 114 on chunks 126a and 126b. The learner 108 trains local predictive model 116 on chunks 126c and 126c. The learner 110 trains local predictive model 118 on chunks 126e and 126f. And the learner 112 trains local predictive model 120 on chunks 126g and 126h. The parameters of the local predictive models 114, 116, 118 and 120 are then combined by a data collecting node 122, which comprises one or more data processing apparatus and is programmed with computer instructions for producing a final predictive model 124. Model parameter combination is described further below.

Referring back to FIG. 1, the data collecting node 122 combines the parameters from the local predictive models of the learners. In some implementations, the parameters are combined by averaging the values for each parameter together. Other ways of combining the parameters are possible.

Figure 2:
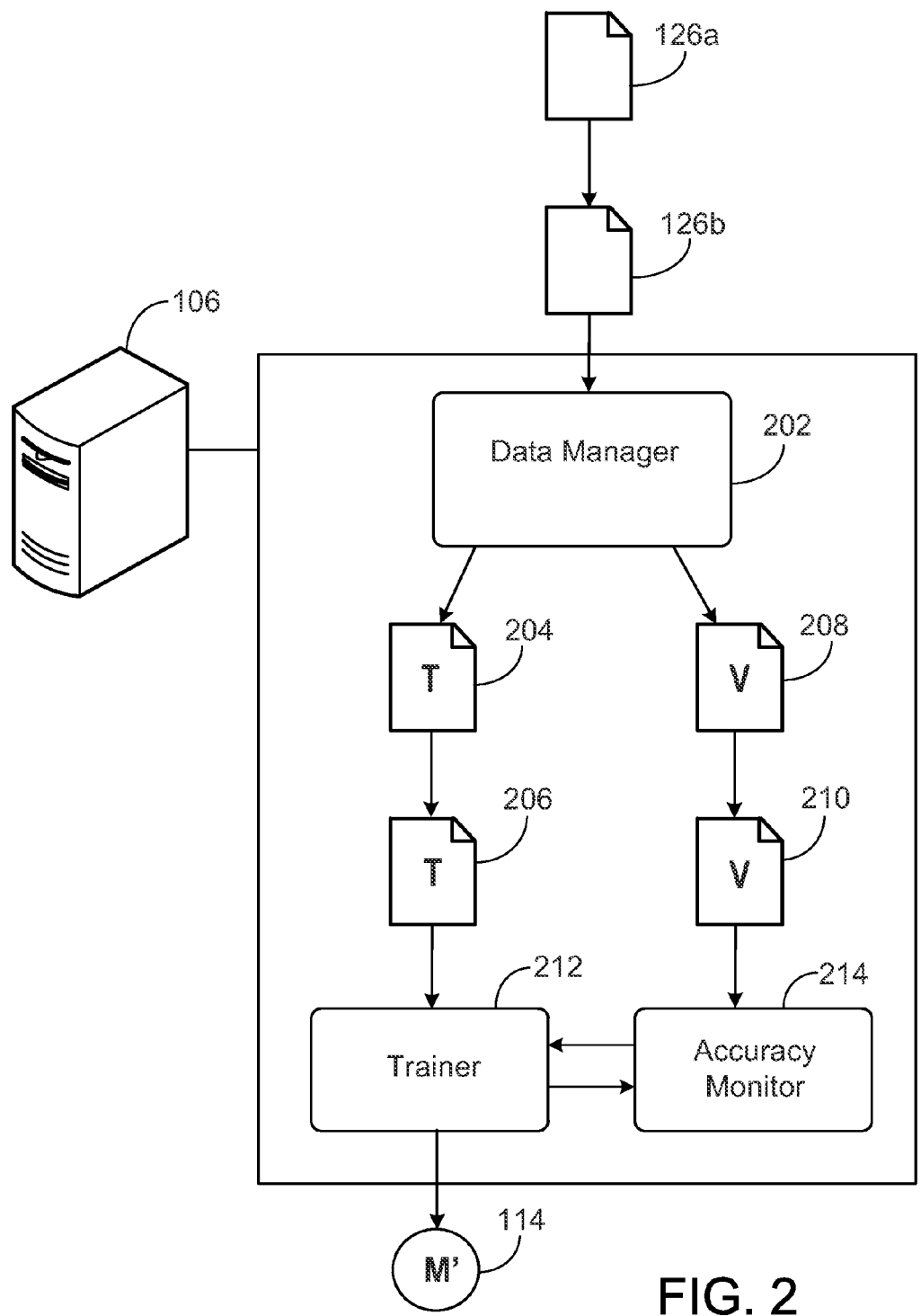
FIG. 2 is an illustration of an example learner.

FIG. 2 is an illustration of an example learner. The learner includes a data manager component 202, a trainer component 212 and an accuracy monitor component 214. Each component is implemented by computer instructions which are executed by the learner (e.g., learner 106). The data manager 202 receives chunks 126a and 126b from the data distribution node 102 and queues them up for processing. Alternatively, the data manager 202 can request a new chunk from the data distribution node when the learner has finished processing a current chunk. That is, rather than being a "push" system where the data processing node 102 distributes chunks to learners without the chunks having been requested by the learners, the learners can "pull" chunks from the data processing node 102 as they complete processing of a current chunk by requesting another chunk from the data processing node 102.

In order to validate the local prediction model, part of the training examples in the chunk are put aside as the validation portion which is used to validate the local predictive model, and the remaining training examples form the training portion which is used to train the local predictive model. In some implementations, the examples used for training can be randomly selected from the training portion. In some implementations, the training portion represents a percentage (e.g., 20%) of the examples in a given chunk. The data manager 202 partitions each chunk into a training portion and a validation portion. For example, chunk 126b is partitioned into training portion 206 and validation portion 210. Likewise, chunk 126a is partitioned into training portion 204 and validation portion 208. As described above, each chunk contains training examples that each comprise one or more data fields and an outcome. The trainer 212 uses examples in each training portion to train the local predictive model. The accuracy monitor 214 (described further below) uses the examples in the validation portion to assess the accuracy of the local predictive model as the model is being trained. Once the accuracy is determined to be sufficient, the training is terminated. In this way, the trainer 212 does not necessarily need to train the local predictive model using all of the examples in a given training portion. When the learner has finished processing all of its training portions (e.g., training portions 204 and 206), the trainer 212 outputs the local predictive model (e.g., local predictive model 114).

Figure 3:
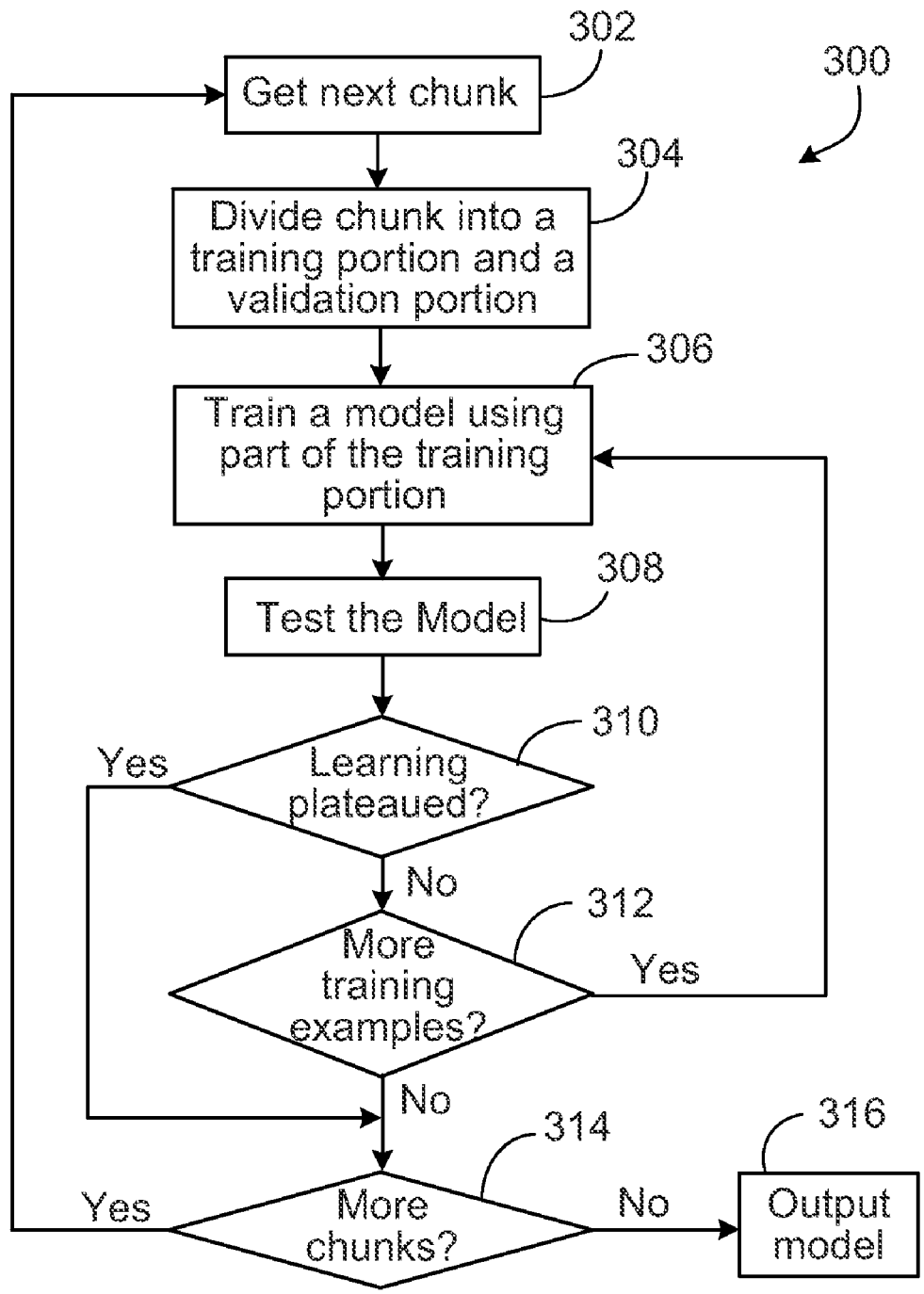
FIG. 3 is a flow diagram of an example learner process.

FIG. 3 is a flow diagram of an example learner process 300. The learner (e.g., learner 110) obtains a chunk of a training dataset from the data distribution node 102 (step 302). A data manager component (e.g., data manager component 202) or another component of the learner divides the chunk into a training portion and a validation portion (step 304). A trainer component (e.g., trainer 212) of the learner trains a local predictive model using examples from the training portion. An accuracy monitor (e.g., accuracy monitor 214) of the learner determines if a learning function of local predictive model indicates that learning has plateaued (step 308). In some implementations, the learning function can be tested while the local predictive model is being trained. In other implementations, training is temporarily stopped so that the learning function can be tested. In various implementations, the learning function is tested only after at least some percentage (e.g., 50%) of the examples in the training portion have been used to train the local predictive model.

The accuracy monitor submits some or all of the training examples in the validation portion (minus the outcomes) as queries to the local predictive model. Alternatively, the accuracy monitor submits all of the training examples from all of the validation portions (minus the outcomes) it has received so far. Each query prediction for each example is compared to the outcome of the example to determine if the prediction was correct or not. In various implementations, the learning function is the number of correct predictions by the local predictive model over the number of total predictions. Other learning functions are possible. In some implementations, the learning function is considered to be plateaued when the second derivative of the function is close to, or equal to, zero. Other ways to determining when the learning function has plateaued are possible.

If the learning curve has plateaued (step 310), then it is determined if the learner has additional chunks to process (314). If so, processing continues at step 302 otherwise the parameters of the local predictive model are provided to data collecting node 122 to be combined with the parameters of other local predictive models (step 316). In some implementations, the parameters are one or more weights, coefficients or other parameters of a machine learning algorithm used to train the local predictive model. These can be parameters of a Naïve Bayes or Support Vector Machine learning algorithm, for example. If the learning curve has not plateaued (step 310), then it is determined if there are more training examples to process in the training portion (step 312). If so, training continues at step 306. Otherwise, processing continues at step 314.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method, the method comprising:
   receiving, by each learner in a plurality of learners, a plurality of respective chunks of a training dataset, each chunk comprising a plurality of training examples, each training example comprising one or more elements and an outcome;
   partitioning, by each learner in the plurality of learners, the plurality of training examples in the learner's respective chunk into a training portion and a validation portion;

training, by each learner in the plurality of learners, a respective predictive model on a proper subset of examples in the learner's training portion, wherein training terminates when a function indicates that an accuracy of the respective predictive model has plateaued; and combining each of the respective predictive models into a final predictive model.

2. The method of claim 1 wherein each respective predictive model is defined by a plurality of weights, and wherein combining each of the respective predictive models into the final model comprises combining the weights of the respective predictive models.

3. The method of claim 2 wherein combining the weights of the respective predictive models comprises averaging the weights.

4. The method of claim 1 wherein training, by the particular learner in the plurality of learners, comprises applying the function to the learner's respective predictive model a number of times during the training.

5. The method of claim 1 wherein accuracy of the respective predictive model is based on a count of a number of correct predictions of the learner's validation portion.

6. The method of claim 1 wherein the function is based on a second derivative of the accuracy.

7. The method of claim 1 wherein training terminates after at least half of the examples of the training portion have been used to train the respective predictive model.

8. The method of claim 1, further comprising randomizing an order of training examples in the training dataset before the dividing.

9. The method of claim 1 wherein the final predictive model is a Naive Bayes classifier, a k-nearest neighbor classifier, a support vector machine, or a predictive model that uses a logistic regression technique.

10. A storage medium having instructions stored thereon that, when executed by data processing apparatus, cause the data processing apparatus to perform operations comprising:
receiving, by each learner in a plurality of learners, a plurality of respective chunks of a training dataset, each chunk comprising a plurality of training examples, each training example comprising one or more elements and an outcome;
partitioning, by each learner in the plurality of learners, the plurality of training examples in the learner's respective chunk into a training portion and a validation portion;
training, by each learner in the plurality of learners, a respective predictive model on a proper subset of examples in the learner's training portion, wherein training terminates when a function indicates that an accuracy of the respective predictive model has plateaued; and
combining each of the respective predictive models into a final predictive model.

11. The storage medium of claim 10 wherein each respective predictive model is defined by a plurality of weights, and wherein combining each of the respective predictive models into the final model comprises combining the weights of the respective predictive models.

12. The storage medium of claim 11 wherein combining the weights of the respective predictive models comprises averaging the weights.

13. The storage medium of claim 10 wherein training, by the particular learner in the plurality of learners, comprises applying the function to the learner's respective predictive model a number of times during the training.

14. The storage medium of claim 10 wherein accuracy of the respective predictive model is based on a count of a number of correct predictions of the learner's validation portion.

15. The storage medium of claim 10 wherein the function is based on a second derivative of the accuracy.

16. The storage medium of claim 10 wherein training terminates after at least half of the examples of the training portion have been used to train the respective predictive model.

17. The storage medium of claim 10, wherein the operations further comprise randomizing an order of training examples in the training dataset before the dividing.

18. The storage medium of claim 10 wherein the final predictive model is a Naive Bayes classifier, a k-nearest neighbor classifier, a support vector machine, or a predictive model that uses a logistic regression technique.

19. A system comprising:
a storage medium having instructions stored thereon; and
data processing apparatus programmed to execute the instructions to perform operations comprising:
receiving, by each learner in a plurality of learners, a plurality of respective chunks of a training dataset, each chunk comprising a plurality of training examples, each training example comprising one or more elements and an outcome;
partitioning, by each learner in the plurality of learners, the plurality of training examples in the learner's respective chunk into a training portion and a validation portion;
training, by each learner in the plurality of learners, a respective predictive model on a proper subset of examples in the learner's training portion, wherein training terminates when a function indicates that an accuracy of the respective predictive model has plateaued; and
combining each of the respective predictive models into a final predictive model.

20. The system of claim 19 wherein each respective predictive model is defined by a plurality of weights, and wherein combining each of the respective predictive models into the final model comprises combining the weights of the respective predictive models.

21. The system of claim 20 wherein combining the weights of the respective predictive models comprises averaging the weights.

22. The system of claim 19 wherein training, by the particular learner in the plurality of learners, comprises applying the function to the learner's respective predictive model a number of times during the training.

23. The system of claim 19 wherein accuracy of the respective predictive model is based on a count of a number of correct predictions of the learner's validation portion.

24. The system of claim 19 wherein the function is based on a second derivative of the accuracy.

25. The system of claim 19 wherein training terminates after at least half of the examples of the training portion have been used to train the respective predictive model.

26. The system of claim 19, wherein the operations further comprise randomizing an order of training examples in the training dataset before the dividing.

27. The system of claim 19 wherein the final predictive model is a Naive Bayes classifier, a k-nearest neighbor classifier, a support vector machine, or a predictive model that uses a logistic regression technique.

* * * * *